United States Patent [19]
DeSautelle et al.

[11] Patent Number: 5,628,528
[45] Date of Patent: *May 13, 1997

[54] DUAL CHAMBER NONAZIDE GAS GENERATOR

[75] Inventors: James J. DeSautelle, Rochester Hills; Janie M. Vitek, Commerce, both of Mich.

[73] Assignee: Automotive Systems Laboratory, Inc., Farmington Hills, Mich.

[*] Notice: The term of this patent shall not extend beyond the expiration date of Pat. No. 5,622,380.

[21] Appl. No.: 498,852

[22] Filed: Jul. 6, 1995

[51] Int. Cl.$^6$ ............................................. B60R 21/26
[52] U.S. Cl. .......................... 280/736; 280/741; 102/531
[58] Field of Search ........................... 280/741, 736, 280/740, 742, 728.1; 102/530, 531, 443; 422/164, 165, 166

[56] References Cited

U.S. PATENT DOCUMENTS

| | | | |
|---|---|---|---|
| 34,615 | 3/1862 | Shannon | 102/443 |
| 2,529,791 | 11/1950 | Whitworth et al. | 102/530 |
| 3,726,220 | 4/1973 | MacDonald et al. | 102/530 |
| 3,797,854 | 3/1974 | Poole et al. | 280/741 |
| 4,369,079 | 1/1983 | Shaw | 280/728.1 |
| 4,530,516 | 7/1985 | Adams et al. | 280/741 |
| 4,865,667 | 9/1989 | Zeuner et al. | 280/741 |
| 4,950,458 | 8/1990 | Cunningham | 280/741 |
| 5,009,855 | 4/1991 | Nilsson | 422/164 |
| 5,320,382 | 6/1994 | Goldstein et al. | 280/735 |
| 5,345,875 | 9/1994 | Anderson | 102/530 |
| 5,364,126 | 11/1994 | Kuretake et al. | 280/741 |
| 5,400,487 | 3/1995 | Gioutsos et al. | 280/735 |

FOREIGN PATENT DOCUMENTS

| | | | |
|---|---|---|---|
| 4005768 | 8/1991 | Germany | 280/736 |
| 4-345556 | 12/1992 | Japan | 280/736 |
| 5-319199 | 12/1993 | Japan | 280/736 |

*Primary Examiner*—Brian L. Johnson
*Assistant Examiner*—Peter C. English
*Attorney, Agent, or Firm*—Lyman R. Lyon, P.C.

[57] ABSTRACT

A gas generator (10) utilizes two segregated propellant container/combustion chambers (62) and (64), each having a plurality of nonazide propellant grains (40 and 66) therein, and an igniter (24) for igniting only the propellant grains (40) located within the first combustion chamber (62). The nonazide propellant produces enough heat energy to subsequently ignite the segregated propellant grains (66) by forced convection and/or heat conduction.

3 Claims, 3 Drawing Sheets

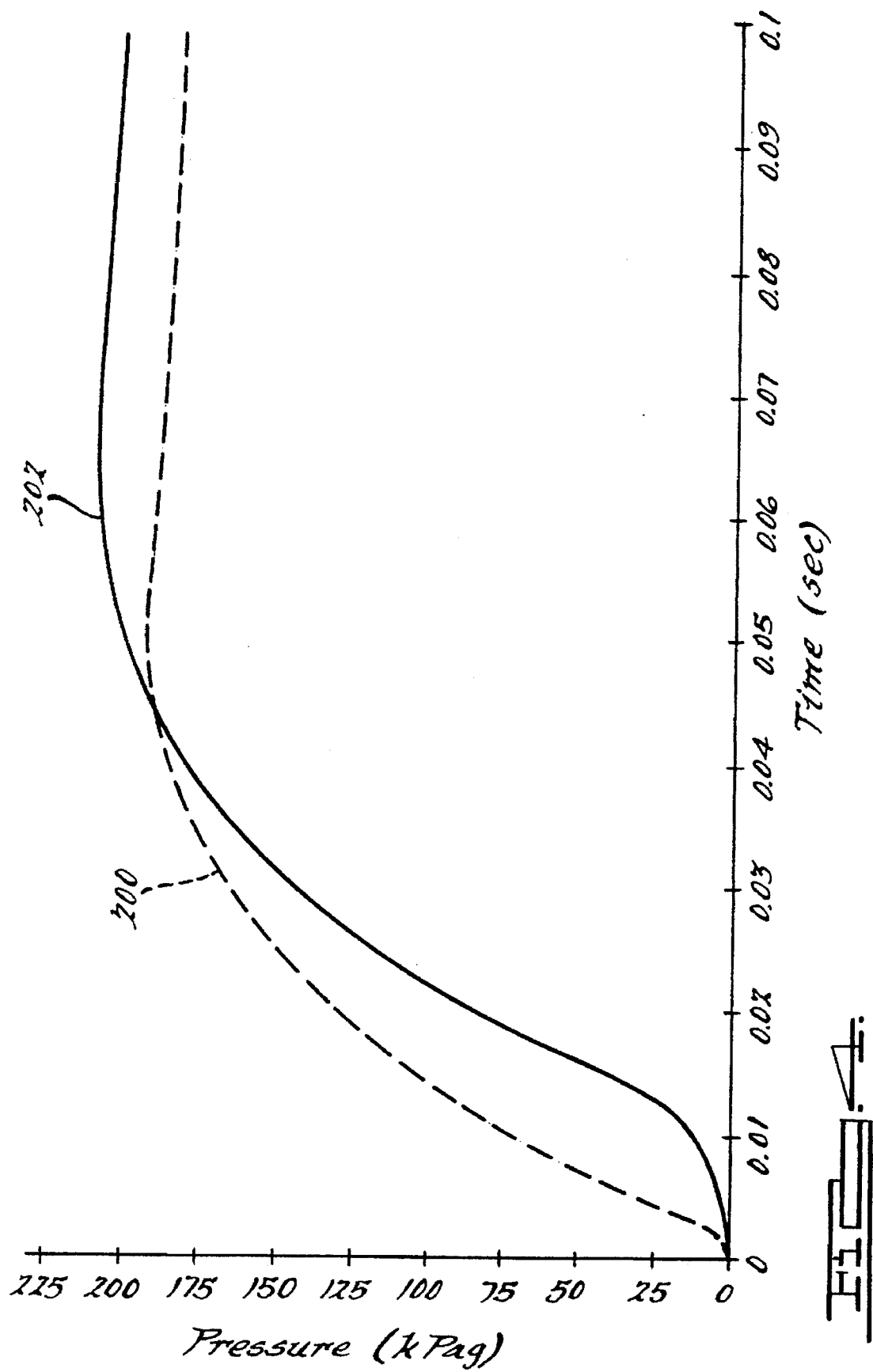

DUAL CHAMBER NONAZIDE GAS GENERATOR

BACKGROUND OF THE INVENTION

The present invention generally relates to gas generators such as used to inflate air bags in an automobile occupant protection system, and more particularly to an improved gas generator having a variable inflation rate output capable of safely achieving a low onset inflation.

The prior art generally discloses inflation systems for deploying an air bag in a motor vehicle which provide a single gas generator in fluid communication with the uninflated air bag. The gas generator is typically triggered by an air bag firing circuit when the sensed vehicle acceleration exceeds a predetermined threshold value, as through the use of an acceleration-responsive inertial switch and an explosive "squib."

Conventional single gas generator inflation systems suffer from the disadvantage that the onset pressurization/inflation rate is generally set to provide an aggressive or rapid initial inflation in order to achieve a particular inflation time even for an occupant positioned relatively close to the air bag. However, an aggressive and uncontrolled onset rate of pressurization becomes problematic in situations where the occupant is out of position. More specifically, the rapid pressurization can cause the air bag to impact against the occupant with enough force to injure the occupant.

In commonly owned U.S. Pat. No. 5,400,487, Gioutsos et al teach an inflation system which overcomes the above-described problems by utilizing a plurality of gas generators which are controllably ignited to provide a variable inflation profile which can be tailored to any given occupant position and for any crash type. While this arrangement dramatically improves the inflation efficiency so as to maximize an air bag's ability to protect an occupant, it does so at significantly higher expense and complexity. More specifically, the multiple gas generators and squibs add considerable cost to the system, while the firing control circuitry requires sophisticated processors capable of accurately timing the various ignition times.

In U.S. Pat. No 5,009,855 Nilsson discloses a gas generator which positions an insert within the propellant combustion chamber so as to partially separate the combustion chamber into two sections having different volumes. In operation, an igniter generates a flame front which initially ignites a small portion of the propellant as the flame front passes through the first section of the combustion chamber, and then ultimately the remaining propellant as the flame front passes around the insert and reaches the second section of the combustion chamber. Nilsson teaches that the gas volume produced by the first propellant section gently presses an out-of-position occupant into the vehicle seat before the second propellant section rapidly inflates the bag to the maximum volume within the shortest possible time.

While Nilsson discloses a gas generator arrangement which produces a lower onset rate of inflation, the precise rate of onset can only be controlled to a small degree since the same igniter flame front must be used to ignite both propellant sections. Therefore, a need still exists for a gas generator which can satisfactorily produce variable inflation pressurization with a low onset rate.

SUMMARY OF THE INVENTION

Accordingly, it is an object of the present invention to provide an improved gas generator for use in a vehicle air bag inflation system which can optimally produce a low onset rate of pressurization without sacrificing peak inflation pressure or inflation time.

Another object of the present invention is to provide an improved gas generator which utilizes combustion of a first nonazide propellant charge to conductively ignite a segregated second nonazide propellant charge.

In accordance with the present invention, a gas generator having a variable output gas generation rate comprises a housing having a plurality of apertures spaced therein, a first propellant chamber located within the housing and arranged to be in fluid communication with the plurality of apertures, and a second propellant chamber located within the housing and arranged to be in fluid communication with the plurality of apertures. A first nonazide propellant charge is positioned within the first chamber having a predetermined burn temperature, and a second nonazide propellant charge is positioned within the second chamber. An igniter is positioned within the housing for supplying a flame front to only the first propellant chamber, wherein the ignition of the first charge by the flame front produces heat energy which subsequently conductively ignites the second nonazide propellant charge. Isolation of the first and second propellant chambers is achieved by a barrier affixed within the housing. The barrier effectively impedes the igniter flame front from passing from the first chamber to the second chamber.

The present invention will be more fully understood upon reading the following detailed description of the preferred embodiment in conjunction with the accompanying drawings.

BRIEF DESCRIPTION OF THE DRAWINGS

FIG. 4 is a graph of comparative inflator pressure curves.

DETAILED DESCRIPTION OF THE PREFERRED EMBODIMENT(S)

Figure 1:
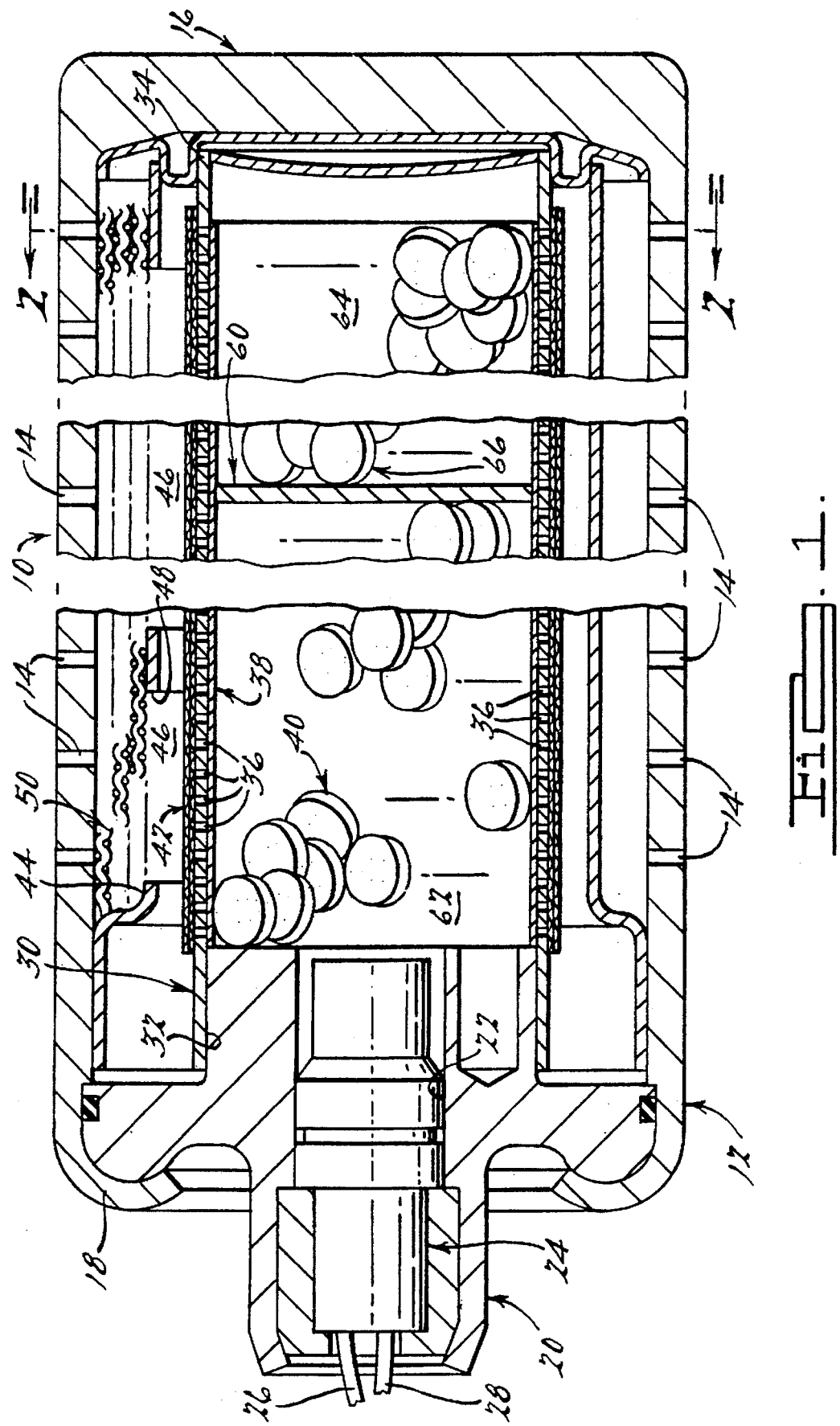
FIG. 1 is a cross-sectional view of an inflator having two propellant chambers in accordance with a first exemplary embodiment.
Figure 2:
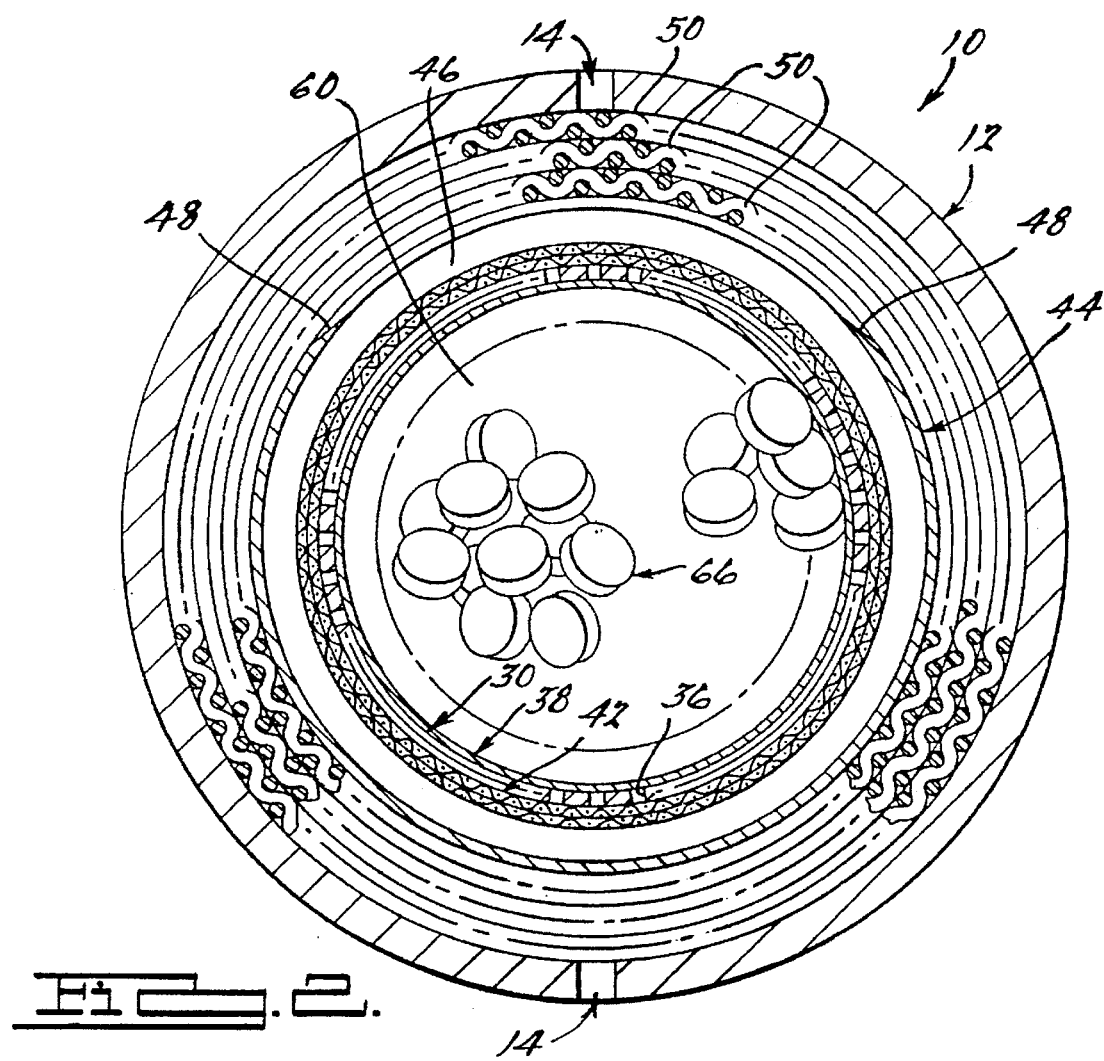
FIG. 2 is a view taken in the direction of the arrow 2 of FIG. 1.

As seen in FIGS. 1 and 2, a gas generator or inflator 10 for an automobile air bag, in accordance with a first exemplary constructed embodiment of the present invention, comprises a housing 12, for example, an aluminum forging provided with a plurality of gas discharge orifices 14. The housing 12 has an integral closure 16 at one end and is open at the opposite end 18 for the acceptance of an end closure 20. The end closure 20 has a central bore 22 for the acceptance of a conventional igniter 24. The igniter 24 is provided with a pair of electrical conductors 26 and 28 to facilitate electric ignition of an explosive charge contained therein.

A cylindrical propellant tube 30 has one end portion 32 supported on the end closure 20 and an opposite end portion 34 supported by the closed end portion 16 of the housing 12.

The propellant tube 30 is provided with a plurality of relatively small apertures 36. The inside of the propellant tube 30 is provided with a burst foil 38 which controls pressure buildup and flame front propagation through a plurality of nonazide propellant grains 40 and 66 disposed internally of the propellant tube 30.

The propellant tube 30 is surrounded by a slagging screen 42 comprising one or more layers of mesh wire. A baffle tube 44 is telescoped about the propellant tube 30 in radially spaced relation to the slagging screen 42 thereon, so as to define a plenum 46 radially outwardly from the screen 42. The baffle tube 44 is provided with a plurality of relatively large apertures 48 and is surrounded by a final filter screen 50.

Gases generated by the propellant 40 exit from the propellant tube 30 through the apertures 36 therein, pass through the slagging screen 42 and enter the plenum 46 defined by the space between the slagging screen 42 and the radially inner wall of the baffle tube 44. Thereafter, the gases flow radially outwardly through the apertures 48 in the baffle tube 44 and final filter screen 50 to exit through the orifices 14 in the housing 12.

In accordance with the present invention, low onset pressurization is achieved by positioning a rigid barrier 60 within the propellant tube 30 so as to form two separate propellant chambers 62 and 64. The barrier 60 provides a mechanism for preventing the passage of the flame front generated by the igniter 24 from directly causing combustion of propellant grains 66 located within chamber 64. Instead, the heat generated by the combustion of the propellant grains 40 causes subsequent delayed ignition of the propellant grains 66 by forced convection and/or conduction. More specifically, the heat energy inherently flows from the higher temperature chamber 62 to the cooler chamber 64, such as by way of apertures 36 and plenum 46. Because the propellant grains located in the first chamber 62 are composed of a nonazide formula, the amount of heat inherently generated at combustion is sufficiently high enough to conductively ignite the propellant grains located within chamber 64. A conventional azide propellant mixture would not produce enough heat energy to ignite a combustion chamber which is completely isolated from the igniter 24 flame front.

Figure 3:
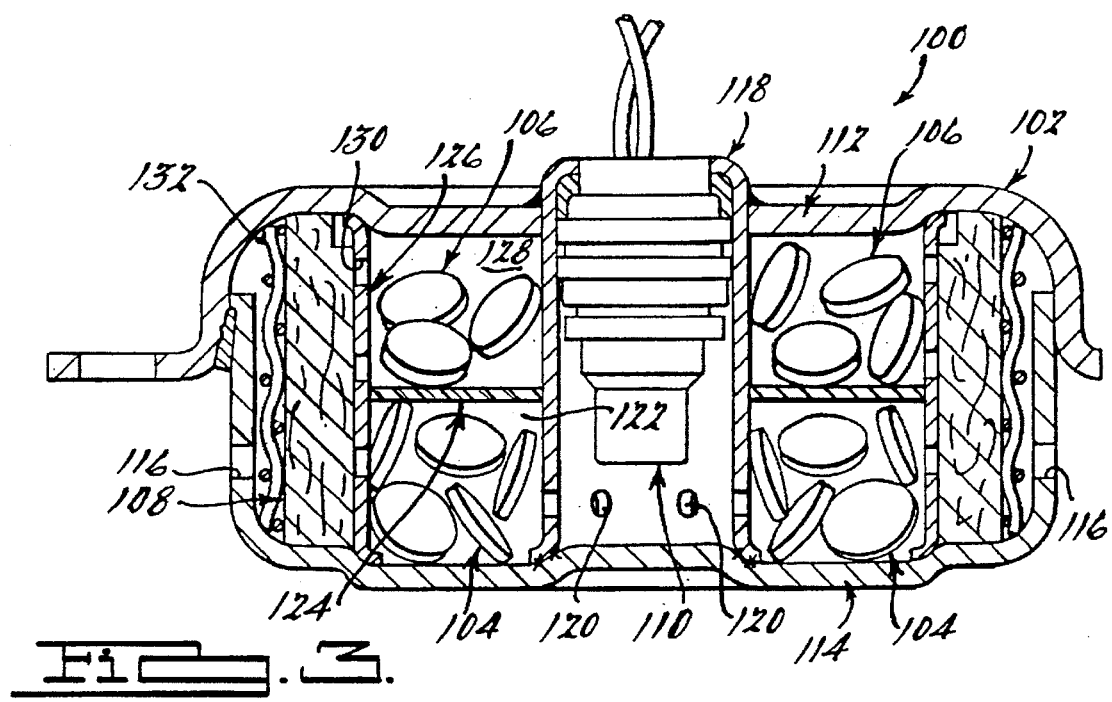
FIG. 3 is a cross-sectional view of a second exemplary inflator embodiment.

As seen in FIG. 3 of the drawing, an inflator 100 in accordance with second exemplary constructed embodiment of the present invention comprises four major components, namely, a housing 102, a nonazide propellant 104 and 106, a filter 108, and an igniter 110.

The inflator housing 102 is formed by two dish-shaped sections 112 and 114 that are welded together in inverted nested relationship. The lower housing portion 114 contains a plurality of apertures 116 for the discharge of gas produced by the propellant into an air bag (not shown).

The housing 102 is provided with a centrally disposed igniter support tube 118 having a flared lower end portion that is welded to a complementary boss in the lower housing 114. Tube 118 supports the igniter 110 internally thereof, and is welded to the upper housing 112.

The igniter tube 118 is provided with a plurality of apertures 120 disposed in a circumferential array at a point underlying the igniter 110. The apertures 120 allow a flame front generated by the igniter 110 to pass to the nonazide propellant 104 located within a first combustion chamber 122. A barrier wall 124 is positioned between the igniter tube 118 and a propellant retainer sleeve 126 to form a second combustion chamber 128. Propellant 106 is located within the second combustion chamber 128. The retainer sleeve 126 has a plurality of apertures 130 therein to permit a radially outward passage of gas generated by the propellant 104 and 106. The filter 108 comprises a fine wire mesh annulus that is resiliently axially compressed between the housing portions 112 and 114 upon assembly thereof. The filter 108 is radially retained by a relatively heavy wire screen 132 that accommodates radial expansion of the filter element 108 due to longitudinal compression upon assembly of the housing components 112 and 114.

Just as with the first exemplary embodiment 10, the heat energy generated by the combustion of the propellant 104 causes subsequent delayed ignition of the propellant 106 by forced convection and/or conduction. The igniter flame front only passes into the first combustion chamber 122, while the heat produced therein conductively reaches the second combustion chamber 128 via the plurality of apertures 130.

As described above, the present invention advantageously utilizes the high combustion temperature of a nonazide propellant mixture to allow the respective combustion chambers to be completely segregated. In this manner, the overall inflation profile output by the gas generator can be optimally controlled and tailored to achieve a desired inflation profile.

As seen in FIG. 4, curve 200 illustrates a conventional inflater output having excessive rise of air bag inflation pressure in the first 30 milliseconds. As described above, this rapid pressure rise is caused by the high combustion gas onset rate. However, the conductively ignited second propellant chamber of the present invention achieves a desirable "low onset" S curve as illustrated by curve 202 without sacrificing peak inflation time or pressure.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

We claim:

1. A gas generator having a variable output gas generation rate comprising:

a housing having a plurality of apertures spaced therein;

a first propellant chamber located within said housing and arranged to be in fluid communication with said plurality of apertures;

a second propellant chamber located within said housing and arranged to be in fluid communication with said plurality of apertures;

a first nonazide propellant charge positioned within said first chamber having a predetermined burn temperature;

a second nonazide propellant charge positioned within said second chamber; and an igniter positioned within said housing for supplying a flame front to only said first propellant chamber, wherein the ignition of said first charge by said flame front produces heat energy which subsequently conductively ignites said second nonazide propellant charge, wherein said first and second propellant chambers are respectively separated by a solid barrier which impedes, the igniter flame front from passing from said first chamber to said second chamber.

2. The gas generator of claim 1 wherein said first and second chambers are radially arranged about said igniter.

3. The gas generator of claim 1 wherein said first and second chambers are axially arranged relative to said igniter so as to form a stacked configuration.

* * * * *